US010193998B2

(12) United States Patent
Ueta et al.

(10) Patent No.: US 10,193,998 B2
(45) Date of Patent: Jan. 29, 2019

(54) COMMUNICATION APPARATUS, COMMUNICATION SYSTEM, AND CIRCUIT CONFIGURATION CONTROL METHOD

(71) Applicant: HITACHI, LTD., Tokyo (JP)

(72) Inventors: Taisuke Ueta, Tokyo (JP); Masayuki Takase, Tokyo (JP); Jun Sugawa, Tokyo (JP); Yasunari Shinohara, Tokyo (JP)

(73) Assignee: HITACHI, LTD., Tokyo (JP)

( * ) Notice: Subject to any disclaimer, the term of this patent is extended or adjusted under 35 U.S.C. 154(b) by 301 days.

(21) Appl. No.: 15/346,899

(22) Filed: Nov. 9, 2016

(65) Prior Publication Data

US 2017/0237828 A1  Aug. 17, 2017

(30) Foreign Application Priority Data

Feb. 15, 2016  (JP) ................................. 2016-025478

(51) Int. Cl.
*H03K 19/173* (2006.01)
*G06F 7/38* (2006.01)
*H04L 29/08* (2006.01)
*H04L 12/46* (2006.01)
*H04L 29/06* (2006.01)
*H04W 88/02* (2009.01)

(52) U.S. Cl.
CPC .......... *H04L 67/34* (2013.01); *H04L 12/4641* (2013.01); *H04L 67/10* (2013.01); *H04L 67/327* (2013.01); *H04L 67/42* (2013.01); *H04W 88/02* (2013.01)

(58) Field of Classification Search
CPC ......................... H04W 88/02; H04L 12/4641
See application file for complete search history.

(56) References Cited

U.S. PATENT DOCUMENTS

| | | | |
|---|---|---|---|
| 8,106,679 B2 | 1/2012 | Sato | |
| 8,786,310 B1 * | 7/2014 | Lu | .............................. G06F 7/38 326/38 |
| 8,841,935 B1 * | 9/2014 | Natarajan | ...... H03K 19/017581 326/38 |
| 2008/0122482 A1 * | 5/2008 | Sato | .................... G06F 15/7867 326/38 |

FOREIGN PATENT DOCUMENTS

| | | |
|---|---|---|
| JP | 2000-252814 A | 9/2000 |
| JP | 2010-171994 A | 8/2010 |

* cited by examiner

*Primary Examiner* — Anh Q Tran
(74) *Attorney, Agent, or Firm* — Volpe and Koenig, P.C.

(57) ABSTRACT

To enable a communication apparatus, which transmits and receives data with a partially reconfigurable logic circuit, to configure a module while continuing a communication process. A communication apparatus transmits and receives data and includes a partially reconfigurable logic circuit and a management unit for managing a circuit configuration of the logic circuit. The logic circuit includes a plurality of modules and a data distribution unit. The management unit fixedly arranges a plurality of coupling interfaces, which are used for sending data to a module determined as a distribution destination of data by the data distribution unit and which are respectively linkable to the plurality of modules, at prescribed positions on the logic circuit, and creates the module in the partially reconfigurable area of the logic circuit so as to be linked to any of the plurality of coupling interfaces.

12 Claims, 16 Drawing Sheets

FIG. 3

| Used service | Used module ID |
|---|---|
| Mobile | 1 |
| DPI | 4 |
| ⋮ | ~ |

| Apparatus ID | Line card ID | Total number of modules | Service | Used module ID |
|---|---|---|---|---|
| 1 | 1 | 8 | Mobile | 1 |
| | | | DPI | 4,5 |
| | | | FW | 7 |
| | 2 | | | |
| 2 | | | | |

| Apparat us ID | Line card ID | Total module resource | Module ID | Service | Used resource | Circuit arrangement |
|---|---|---|---|---|---|---|
| 1 | 1 | 1,000,000 | 1 | Mobile | 100,000 | Arrangement A |
|   |   |   | 4 | DPI | 250,000 | Arrangement B |
|   |   |   | 7 | FW | 150,000 | Arrangement C |
|   | 2 |   |   |   |   |   |
| 2 |   |   |   |   |   |   |

611  612  613  614  615  616  617

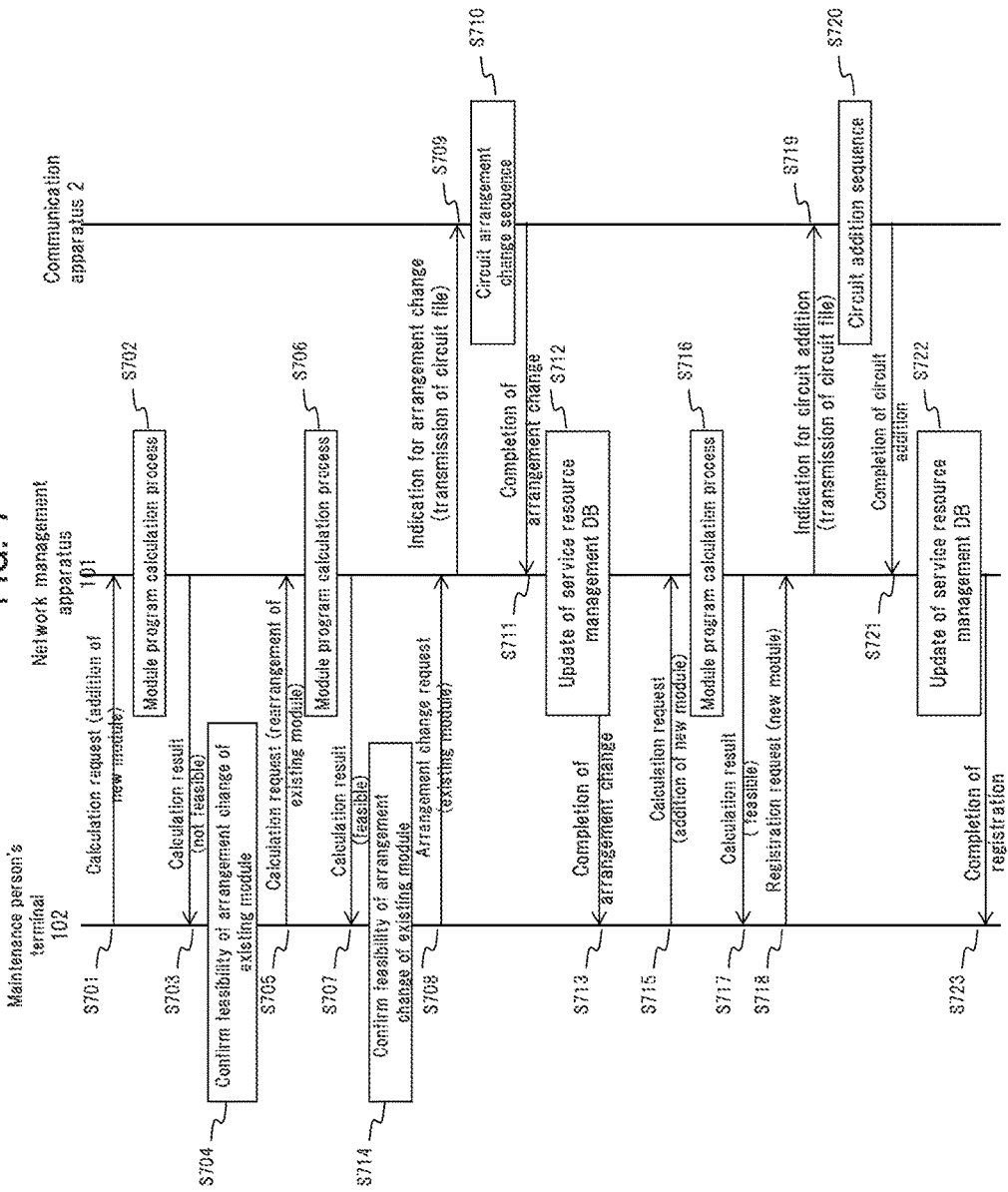

COMMUNICATION APPARATUS, COMMUNICATION SYSTEM, AND CIRCUIT CONFIGURATION CONTROL METHOD

BACKGROUND OF THE INVENTION

1. Field of the Invention

The present invention relates to a communication apparatus configured using a logic circuit with a changeable circuit configuration.

2. Description of the Related Art

In recent years, progress made in cloud computing and the internet of things (IoT) has led to the diversification of services provided via networks and, consequently, devices related to various services are being connected to networks. Whereas a dedicated communication apparatus or a dedicated network has been conventionally constructed for each service, in order to integrate and accommodate a variety of services, studies on virtualization technology are underway to construct a virtual machine which performs processing corresponding to each service on a general-purpose server or, more specifically, on a CPU of a general-purpose server.

Meanwhile, with the diversification of businesses and services, the capacity of traffic in communication systems is increasing and limits in software processing performances of CPUs have become a concern. In consideration thereof, hardware offload which enhances performance by extracting part of software processing and processing the extracted part by hardware is being studied.

Utilization of hardware offload is already underway in data retrieval by cloud providers and the like and, in the future, it is anticipated that there will be a greater need to offload various functions on hardware and improve processing performance of each function.

A field-programmable gate array (FPGA) is attracting attention as hardware with high processing performance per power consumption in realizing hardware offload. An FPGA enables an entire or a partial circuit configuration to be configured or changed by writing a circuit file describing circuit configuration information in accordance with a function to be realized by the FPGA. An operation of writing a circuit file to an FPGA is referred to as configuration. Even after an FPGA is manufactured, it is possible to configure or change a circuit configuration of the FPGA by a purchaser or a designer performing the configuration. For example, a logic circuit can be programmed on site.

Prior art regarding programmable hardware such as an FPGA include the following.

Japanese Patent Application Laid-open No. 2000-252814 discloses a technique involving storing in advance, in storage means, information of a plurality of hardware modules (hereinafter, also simply referred to as "modules") of which physical shapes on a programmable logic circuit differ from one another when reconfigured on the logic circuit, and preferentially using a module matching a shape of a free area in the programmable logic circuit when performing partial rewriting. A circuit area can be efficiently utilized by using a module matching a shape of the free area.

Japanese Patent Application Laid-open No. 2010-171994 discloses a dynamic reconfiguration technique of a logic circuit, the technique involving providing, in advance, an arithmetic core including a selector to which is input multi-bit function codes respectively indicating a logic operation and which selects output data based on input data, and supplying a function code to an arithmetic core to change an operation.

With the technique described in Japanese Patent Application Laid-open No. 2010-171994, since logic can be changed by a function code, the time required for reconfiguration can be reduced as compared to hardware such as an FPGA which stores a configuration of a circuit in a lookup table (LUT). Accordingly, only a circuit required in each instant can be dynamically generated in hardware space as a circuit instance.

A data processing apparatus including a logic circuit that is reconfigurable due to the technique described in Japanese Patent Application Laid-open No. 2010-171994 enables an allocation of a hardware resource to an urgently required function to be increased and an allocation of a hardware resource to a function not required urgently to be reduced, even during use of the apparatus.

SUMMARY OF THE INVENTION

As described above, communication functions with different specifications may be utilized for services that differ from each other. When performing hardware offload with a communication apparatus accommodating a wide variety of services, a communication function of each service is respectively realized by an individual module in a partially reconfigurable logic circuit and modules corresponding to the communication functions of services to be accommodated in the communication apparatus are configured in a number corresponding to an amount of traffic. In addition, the communication apparatus desirably continues a communication process even when a module configuration is being changed.

However, neither Japanese Patent Application Laid-open No. 2000-252814 nor Japanese Patent Application Laid-open No. 2010-171994 allows a communication process to be continued when a module configuration is being changed. Therefore, a communication process may be interrupted when changing a module configuration of programmable hardware.

An object of the present invention is to provide a technique which enables a communication apparatus that transmits and receives data with a partially reconfigurable logic circuit to configure a module while continuing a communication process.

A communication apparatus according to an aspect of the present invention is a communication apparatus which transmits and receives data and which includes a partially reconfigurable logic circuit and a management unit that manages a circuit configuration of the logic circuit. The logic circuit includes: a plurality of modules which are located in a partially reconfigurable area of the logic circuit and which executes a prescribed process on received data; and a data distribution unit which determines, based on the received data, a module to be a distribution destination of the received data from the plurality of modules and which distributes the received data to the determined module. The management unit fixedly arranges a plurality of coupling interfaces, which are used for sending data to a module determined as a distribution destination of data by the data distribution unit and which are respectively linkable to the plurality of modules, at prescribed positions on the logic circuit, and creates the module in the partially reconfigurable area of the logic circuit so as to be linked to any of the plurality of coupling interfaces.

According to the present invention, a communication apparatus that transmits and receives data with a partially reconfigurable logic circuit enables a module to be configured while continuing a communication process. Other objects, configurations, and effects of the invention will become apparent from a reading of the following description of an embodiment.

BRIEF DESCRIPTION OF THE DRAWINGS

FIG. 3 is a diagram for explaining a packet distribution management table according to an example;

FIG. 6A is a diagram for explaining a service resource management database when a circuit resource in a partial rewrite area is equally allocated to each module according to an example;

FIG. 6B is a diagram for explaining a service resource management database when a circuit resource in a partial rewrite area is shared and used by all modules according to an example;

FIG. 7 is a sequence diagram showing an example of an addition of a new module accompanying a change in a circuit arrangement of an existing module in a communication system according to an example;

DESCRIPTION OF THE PREFERRED EMBODIMENTS

Hereinafter, an example of the present invention will be described with reference to the drawings. The example described below merely exemplifies the present invention and is not intended to limit the present invention thereto.
<Configuration Example of Communication System>

Figure 1:
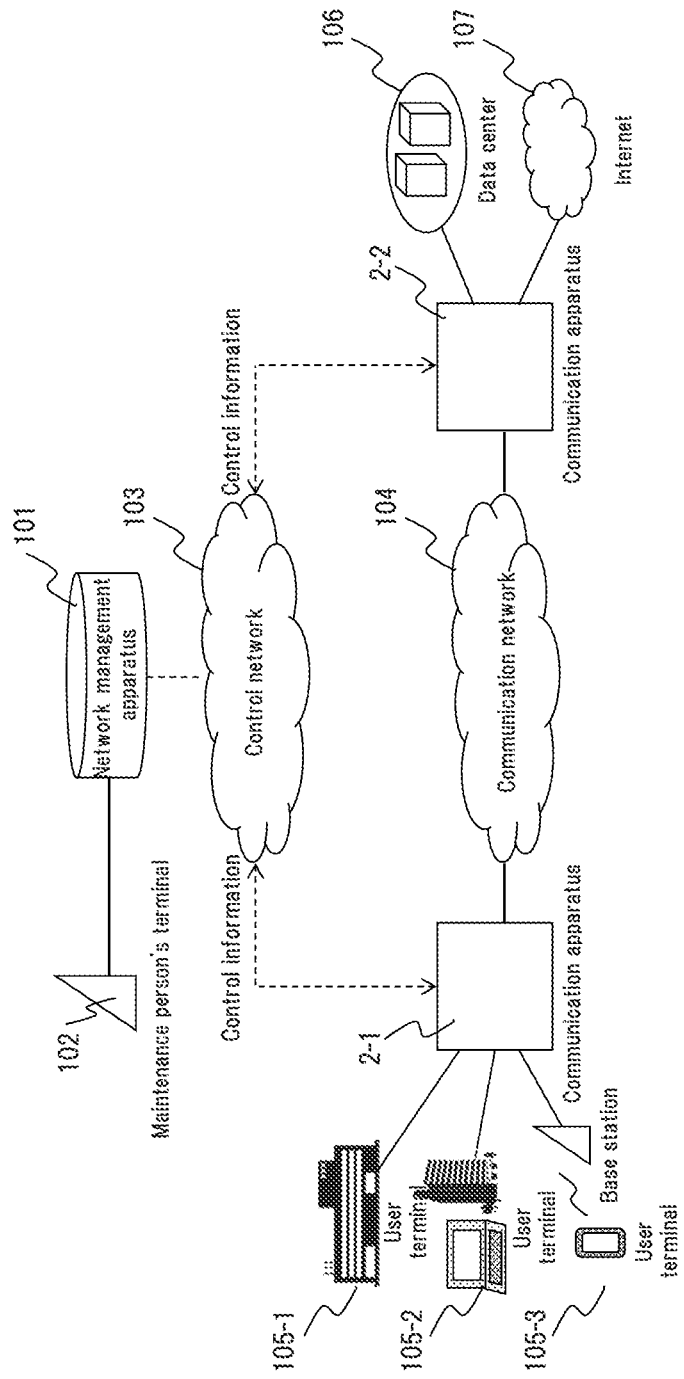
FIG. 1 is a configuration diagram of a communication system according to an example.

FIG. 1 is a configuration diagram of a communication system according to an example.

A communication system according to the present example includes a plurality of communication apparatuses 2-1 and 2-2 (when referred to collectively, described as "communication apparatus 2"), a network management apparatus 101, and a maintenance person's terminal 102, and accommodates services of various user terminals 105 (when referred to collectively, described as "user terminal 105") such as a social infrastructure terminal 105-1, a corporate user terminal 105-2, and a general mobile user terminal 105-3.

The plurality of communication apparatuses 2 construct a communication network 104 and accommodate services of the various user terminals 105. Data flowing on the communication network 104 is processed by the communication apparatuses 2.

In FIG. 1, the communication apparatus 2-1 is coupled to the plurality of user terminals 105 and coupled to the communication apparatus 2-2 via the communication network 104. The communication apparatus 2-2 is coupled to a data center 106 and the Internet 107 and coupled to the communication apparatus 2-1 via the communication network 104. Moreover, the number of the communication apparatuses 2 is not limited to that shown in FIG. 1. In addition, while the communication apparatuses 2 may respectively have different roles such as an edge apparatus (the communication apparatus 2-1) and a core apparatus (the communication apparatus 2-2), no particular distinction will be made in the present example.

The network management apparatus 101 is a computer that manages the plurality of communication apparatuses 2 and is coupled to each communication apparatus 2 via a control network 103. The maintenance person's terminal 102 is coupled to the network management apparatus 101, receives input of configurations of the plurality of communication apparatuses 2 from a maintenance person who is a communication provider or the like, and notifies the maintenance person of statuses of the plurality of communication apparatuses 2 and the communication network 104.
<Configuration Example of Communication Apparatus>

Figure 2:
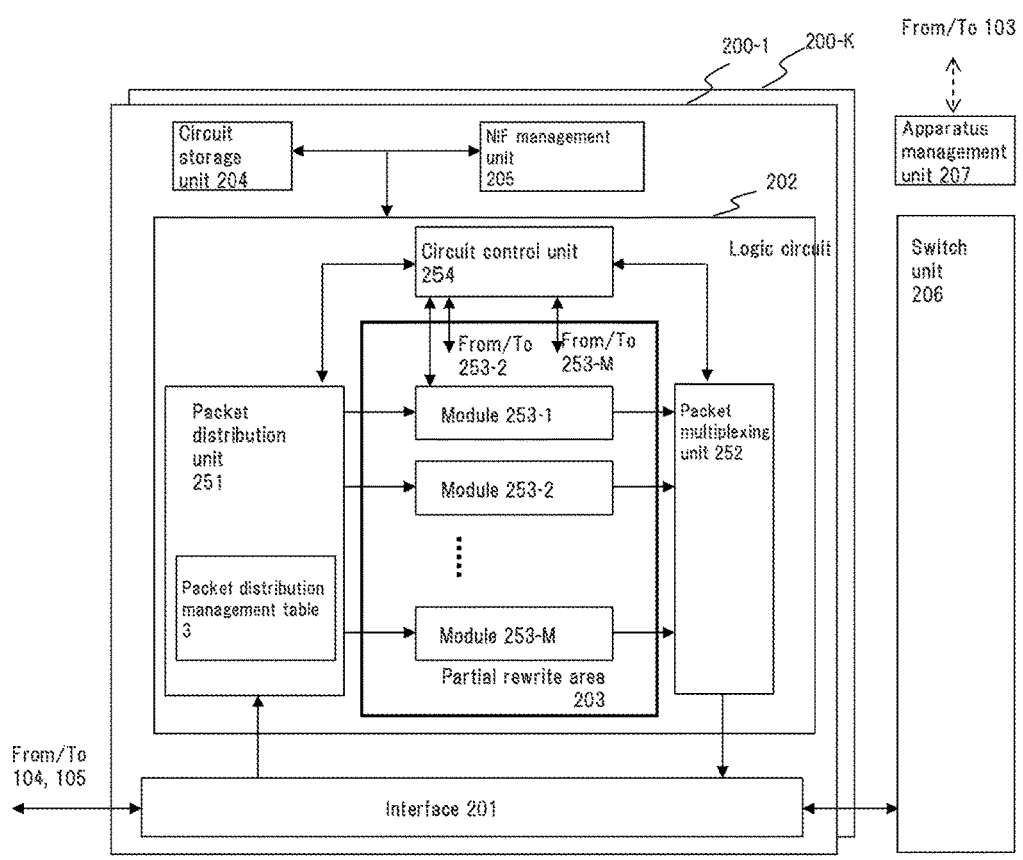
FIG. 2 is a block diagram of a communication apparatus according to an example.

Next, the communication apparatus 2 will be described with reference to FIG. 2. FIG. 2 is a block diagram of the communication apparatus 2 according to the present example.

The communication apparatus 2 is an apparatus which processes data and which transmits and receives data to and from other apparatuses (the other communication apparatus 2, the user terminal 105, the data center 106, and the Internet 107). In FIG. 2, the communication apparatus 2 represents an example of a shelf type multi-service accommodation apparatus mounted with a plurality of network interface boards (NIFs).

The communication apparatus 2 includes a plurality of NIFs 200-1 to 200-K (where K is any natural number) (when referred to collectively, described as "NIF 200"), a switch unit 206, and an apparatus management unit 207.

The communication apparatus 2 transmits and receives data to and from other apparatuses via the NIF 200. The NIF 200 is coupled to the switch unit 206, and the switch unit 206 transfers data received from the NIF 200 to an NIF 200 coupled to an apparatus to which the data is to be transmitted.

The apparatus management unit 207 is coupled to the network management apparatus 101 via the control network 103 and transmits and receives control information to and from the network management apparatus 101. In addition, the apparatus management unit 207 collects various types of information from each NIF 200 and the switch unit 206.

Furthermore, based on an indication from the network management apparatus 101, the apparatus management unit 207 configures parameters with respect to each NIF 200 and the switch unit 206 and installs, in a plurality of modules 253-1 to 253-M (where M is any natural number) (when referred to collectively, described as "module 253") of each NIF 200, a program file (a circuit file describing circuit configuration information) to be used by the module 253 to execute a prescribed process on data.

Each NIF 200 includes an interface 201, a logic circuit 202, a circuit storage unit 204, and an NIF management unit 205.

The interface 201 is an interface used by a general communication apparatus and the communication apparatus 2 transmits and receives data by being coupled to other apparatuses (the other communication apparatus 2, the user terminal 105, the data center 106, and the Internet 107) via the interface 201. In addition, when outputting data to another apparatus from another NIF 200 that differs from the NIF 200 having received the data, data is transmitted from the interface 201 of the other NIF 200 via the switch unit 206.

The circuit storage unit 204 stores a program file to be installed to the logic circuit 202. The program file stored in the circuit storage unit 204 is divided into a common circuit and a data processing circuit to be installed to each module 253. Examples of a common circuit include a packet distribution unit 251, a packet multiplexing unit 252, and a circuit control unit 254. The communication apparatus 2 updates the program file stored in the circuit storage unit 204 based on an indication from the network management apparatus 101.

The NIF management unit 205 controls the circuit control unit 254 of the logic circuit 202 based on an indication from the apparatus management unit 207 and updates the program file in the circuit storage unit 204. The NIF management unit 205 is realized as a program corresponding to the NIF management unit 205 is stored in a memory (not shown) and a CPU executes the program. Moreover, a function of the NIF management unit 205 may be realized by a method other than the CPU executing a program and may also be realized by hardware such as an FPGA.

The logic circuit 202 is a circuit which executes a prescribed process with respect to data and is realized by hardware such as an FPGA of which a circuit configuration is changeable. The logic circuit 202 includes the packet distribution unit 251, the packet multiplexing unit 252, the M-number of modules 253, and the circuit control unit 254.

In addition, a memory (not shown) of the packet distribution unit 251 stores a packet distribution management table 3. Alternatively, the packet distribution management table 3 may be stored in the circuit control unit 254 of the logic circuit 202.

The M-number of modules 253 are configured in a partially reconfigurable partial rewrite area 203 in the logic circuit 202 and circuit reconfiguration is performed within a range of the partial rewrite area 203. For example, all of a circuit resource of the partial rewrite area 203 may be allocated to one module 253 or the circuit resource of the partial rewrite area 203 may be equally allocated to the M-number of modules 253.

Furthermore, in the partial rewrite area 203, a coupled portion between a common circuit portion including the packet distribution unit 251, the packet multiplexing unit 252, the circuit control unit 254, and the like, and the M-number of modules 253 is fixed. In other words, even when a circuit is reconfigured, coupled portions with the common circuit portion of each of the M-number of modules 253 such as a coupling interface for linking to the packet distribution unit 251 and the packet multiplexing unit 252 and a control interface for linking to the circuit control unit 254 remain the same. Accordingly, even when each of the M-number of modules 253 reconfigures a circuit, each processing unit (the packet distribution unit 251, the packet multiplexing unit 252, and the circuit control unit 254) of the common circuit portion need not reconfigure a circuit.

Moreover, an arrangement of physical circuit configurations of the packet distribution unit 251, the packet multiplexing unit 252, the M-number of modules 253, and the circuit control unit 254 included in the logic circuit 202 is not limited to that shown in FIG. 2.

The packet distribution unit 251 refers to the packet distribution management table 3 and distributes input data to the module 253 corresponding to a service type of the data. A service type of data and identification information of the module 253 that is a distribution destination of the data are registered in association with each other in the packet distribution management table 3. Details of the packet distribution management table 3 will be described in detail with reference to FIG. 3. In addition, details of processing by the packet distribution unit 251 will described with reference to FIG. 4.

The packet multiplexing unit 252 multiplexes data input from the M-number of modules 253 and outputs the data to the interface 201 in an order of arrival.

The module 253 is a circuit which is configured in the partial rewrite area 203 and which executes arbitrary data processing. A program for executing data processing in accordance with an accommodated service is installed by the NIF management unit 205. The module 253 executes processing corresponding to the installed program on data input from the packet distribution unit 251 and outputs data to the packet multiplexing unit 252.

The circuit control unit 254 includes a storage area in which data is temporarily stored and stores register values of the respective processing units (the packet distribution unit 251, the packet multiplexing unit 252, and the M-number of modules 253) included in the logic circuit 202.

The circuit control unit 254 is coupled to the respective processing units included in the logic circuit 202 via control lines. The respective processing units included in the logic circuit 202 execute processing using a register value for configuration of the circuit control unit 254 and store processing results in a register value for notification of the circuit control unit 254.

Data received by the NIF 200 is transferred in an order of the interface 201, the packet distribution unit 251, the module 253, the packet multiplexing unit 252, and the interface 201. When outputting data to another apparatus from another NIF 200 that differs from the NIF 200 having received the data, data is further transferred to the switch unit 206 and transmitted from the interface 201 of the other NIF 200 via the switch unit 206.

A basic configuration of the communication apparatus 2 according to the present example can be organized as follows.

A logic circuit 202 includes: a plurality of modules 253 which are located in a partially reconfigurable area of the logic circuit 202 and which execute a prescribed process on data received by the communication apparatus 2; and a packet distribution unit 251 which determines a module 253 to be a distribution destination of the received data from the plurality of modules 253 based on the received data and which distributes the received data to the determined module 253. An NIF management unit 205 fixedly arranges a plurality of coupling interfaces, which are used for sending data to the module 253 determined as a distribution destination of data by the packet distribution unit 251 and which are respectively linkable to the plurality of modules, at prescribed positions on the logic circuit 202. In addition, the NIF management unit 205 creates the module 253 in the partially reconfigurable area of the logic circuit 202 so as to be linked to any of the plurality of coupling interfaces. Since the coupling interface that links the packet distribution unit 251 and the module 253 to each other is fixed, the module 253 can be created so as not to affect operations of the packet distribution unit 251 and existing modules 253 and can be created while continuing a communication process.

In addition, the logic circuit 202 further includes the circuit control unit 254 which controls the plurality of modules 253. The NIF management unit 205 fixedly arranges a plurality of control interfaces, which are used for respectively controlling the plurality of modules 253 by the circuit control unit 254 and which are respectively linkable to the plurality of modules 253, at prescribed positions on the logic circuit 202. Furthermore, the NIF management unit 205 creates a module so as to be linked to any of the plurality of control interfaces. Since the control interface that linkes the circuit control unit 254 and the module 253 to each other is fixed in a configuration in which the plurality of modules 253 are controlled from the circuit control unit 254, the module 253 can be created so as not to affect operations of the circuit control unit 254 and existing modules 253 and can be created while continuing a communication process.

An example of a format of data transmitted and received by the communication apparatus 2 in the present example will now be described. Data according to the present example is assumed to be, for example, an Ethernet™ packet. The packet includes a destination MAC address, a transmission source MAC address, a VLAN header, an ether type value, a payload, and a frame check sequence (FCS).

A MAC address of the destination communication apparatus 2 is registered as the destination MAC address and a MAC address of a transmission source apparatus (for example, another communication apparatus 2) is configured as the transmission source MAC address. An identifier of a protocol of a high-order layer carried by the packet is configured as the ether type value. AVLAN ID which is an identifier of a flow is configured as the VLAN header. A value for detecting an error in a frame is configured as the frame check sequence (FCS). Moreover, the payload of the packet may include a Multiprotocol Label Switching (MPLS) header, an Internet Protocol (IP) header, or a header of another protocol. When including a header of another protocol, a value of an MPLS label, a value of a destination IP address, or the like may be used as the identifier of the flow.

When the communication apparatus 2 accommodates a plurality of services, the packet distribution unit 251 distributes a packet to a relevant module 253 based on a protocol type of the packet, an identifier of the flow, or the like. Data processing by the module 253 in the accommodated services realize various functions including encapsulation, a firewall (FW), traffic control such as policing and coloring, and deep packet inspection (DPI). In the present example, by allocating a circuit resource to each module 253 (in other words, by reconfiguring a circuit of each module 253) so as to optimize a circuit resource in the partial rewrite area 203, various service functions which require different circuit configurations of various sizes can be accommodated.

<Example of Contents of Packet Distribution Management Table>

FIG. 3 is a diagram for explaining the packet distribution management table 3 according to the present example.

The packet distribution unit 251 refers to the packet distribution management table 3 when distributing an input packet to the module 253. The packet distribution management table 3 includes a used service 301 and a used module ID 302. Type identification information which identifies a service type of a received packet is registered in the used service 301. For example, an ether type or a port number is registered as the type identification information. Identification information of the module 253 that is a distribution destination is registered in the used module ID 302. In addition, the packet distribution management table 3 is configured from the circuit control unit 254.

Specifically, the NIF management unit 205 determines the packet distribution management table 3 for the packet distribution unit 251 to distribute data to the module 253 based on a circuit configuration of the module 253 in the logic circuit 202. The packet distribution unit 251 determines a distribution destination of received data based on the packet distribution management table 3. Since the NIF management unit 205 managing the circuit configuration of the module 253 creates the packet distribution management table 3 based on the circuit configuration, the packet distribution unit 251 can readily determine a distribution destination of data using the packet distribution management table 3.

<Packet Distribution Process>

Figure 4:
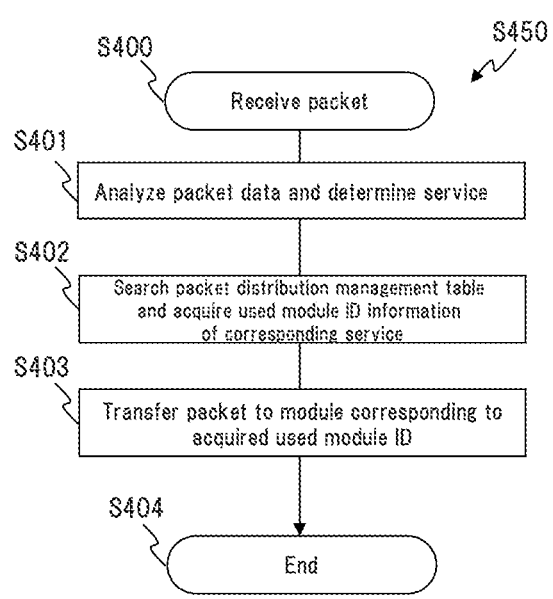
FIG. 4 is a flow chart of a packet distribution process according to an example.

Next, a packet distribution process S450 executed by the packet distribution unit 251 will be described with reference to FIG. 4. FIG. 4 is a flow chart showing a packet distribution process according to the present example.

When the packet distribution unit 251 receives a packet from the interface 201 (S400), the packet distribution unit 251 analyzes packet data and determines a service type (S401). After S401, the packet distribution unit 251 searches the packet distribution management table 3 and acquires a used module ID of a corresponding service (S402). After S402, the packet distribution unit 251 transfers the packet to the module 253 corresponding to the acquired used module ID 302 (S403), and ends the packet distribution process S450 (S404).

<Configuration Example of Network Management Apparatus>

Figure 5:
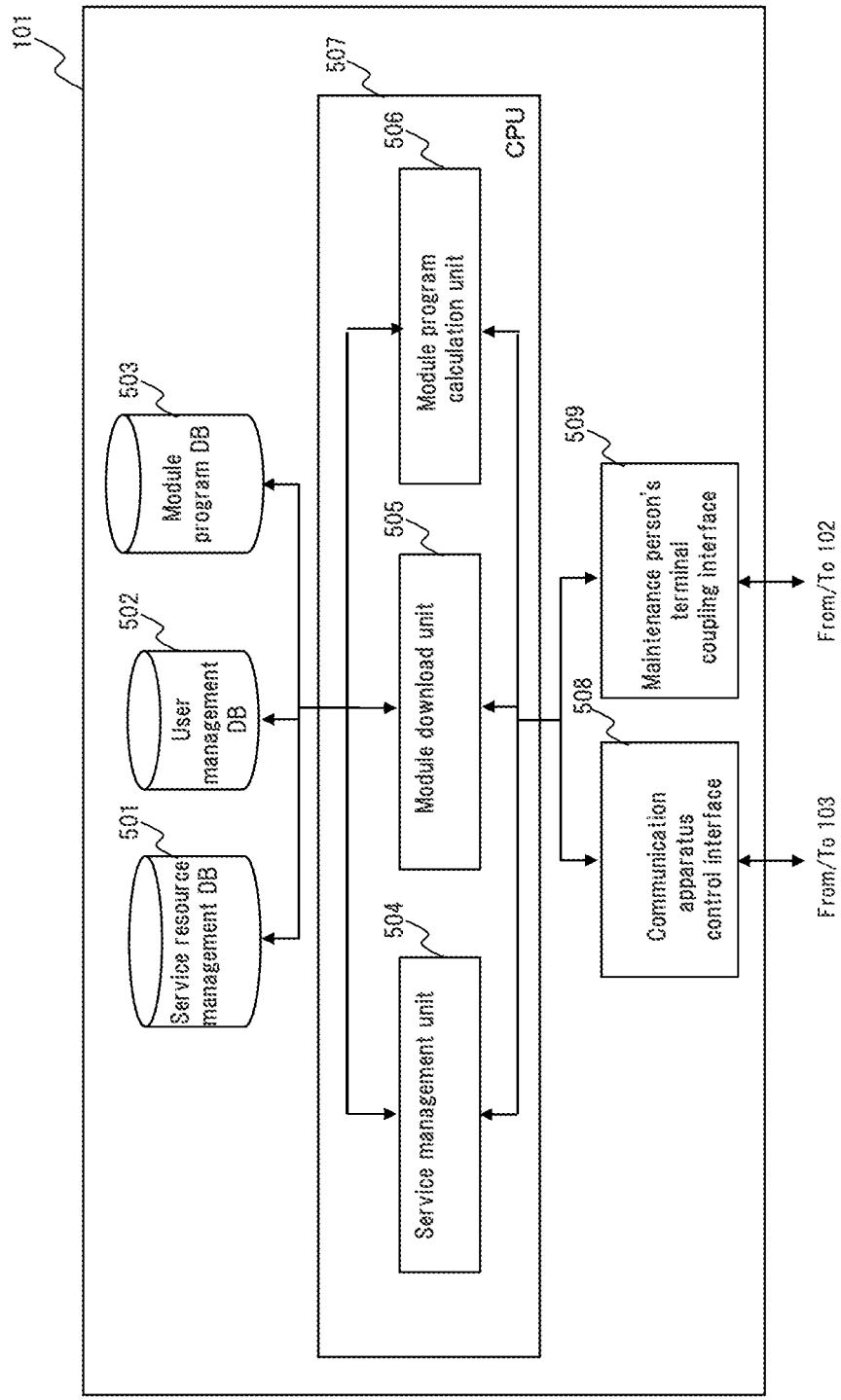
FIG. 5 is a block diagram of a network management apparatus according to an example.

FIG. 5 is a block diagram of the network management apparatus 101 according to the present example.

The network management apparatus 101 includes a service resource management database 501, a user management database 502, a module program database 503, a CPU 507, a communication apparatus control interface 508, and a maintenance person's terminal coupling interface 509.

The CPU 507 is a computing apparatus which implements functions of the network management apparatus 101 by executing a program or the like stored in a memory (not shown). The CPU 507 includes a service management unit 504, a module download unit 505, and a module program calculation unit 506.

The service management unit 504 refers to the service resource management database 501 and manages service types configured to the communication apparatus 2 and resources (circuit resources) to be used for the module 253. Details of the service resource management database 501 will be described with reference to FIG. 6. In addition, the service management unit 504 refers to the user management database 502 and manages information on users stored in the communication system.

The module download unit 505 refers to the module program database 503 and transfers program data of the module 253 to the communication apparatus 2 via the control network 103 coupled to the communication apparatus control interface 508.

When the module program calculation unit 506 receives a calculation request from the maintenance person's terminal 102 which is coupled via the maintenance person's terminal coupling interface 509, the module program calculation unit 506 calculates a program which may assume a circuit configuration to be installed to the module 253 and stores the program file in the module program database 503. Details of processing by the module program calculation unit 506 will described with reference to FIG. 8.

The communication apparatus control interface 508 is an interface used by the network management apparatus 101 to communicate with the communication apparatus 2 (2-1 and 2-2). The maintenance person's terminal coupling interface 509 is an interface used by the network management apparatus 101 to communicate with the maintenance person's terminal 102.

<Example of Contents of Service Information Management Database>

Next, the service resource management database 501 will be described with reference to FIGS. 6A and 6B.

FIG. 6A is a diagram for explaining the service resource management database 501 when a circuit resource in the partial rewrite area 203 is used by being equally allocated to each module 253 according to the present example.

The service resource management database 501 stores information of an apparatus ID 601 which identifies the communication apparatus 2 (2-1 and 2-2), a line card ID (in other words, an ID of the NIF 200) 602 which identifies a line card mounted to the communication apparatus 2, a total number of modules 603 which stores the total number (in other words, M; in this case, an example where M is eight is shown) of modules 253 mounted to the line card; service information 604 stored in the line card; and a used module ID 605 (in other words, ID information of the module 253 used by a service) of each service.

In the case of FIG. 6A, since the circuit resource of the partial rewrite area 203 is equally distributed to and used by the respective modules 253, by managing IDs of the used modules 253 with the service resource management database 501, the network management apparatus 101 can comprehend usage of the circuit resource in the partial rewrite area 203 of each line card. For example, in a portion where the service information 604 is DPI, the used module ID 605 indicates 4 and 5, meaning that a resource corresponding to two modules among a total of eight modules 603 (two-eighths of the circuit resource in the partial rewrite area 203) is being used (refer to FIG. 12A to be described later).

FIG. 6B is a diagram for explaining the service resource management database 501 when the circuit resource in the partial rewrite area 203 is shared and used by all of the modules 253 according to the present example.

The service resource management database 501 stores information of an apparatus ID 611 which identifies the communication apparatus 2 (2-1 and 2-2), a line card ID (in other words, an ID of the NIF 200) 612 which identifies a line card mounted to the communication apparatus 2, a total module resource 613 (in other words, the circuit resource of the partial rewrite area 203) which is allocatable to the modules 253 mounted to the line card, a module ID 614 of each module 253 mounted to the line card, service information 615 stored in each module, a used resource amount 616 of each module 253, and circuit arrangement information 617 configured by each module.

In FIG. 6B, since the circuit resource of the partial rewrite area 203 is shared and used by all modules 253, by managing the used resource amount 616 to be allocated to each module 253 and circuit arrangement information 617 of each module 253 with the service resource management database 501, the network management apparatus 101 can comprehend usage of the circuit resource in the partial rewrite area 203 of each line card. For example, in a portion where the module ID 614 is 4 and the service information 615 is DPI, the used resource amount 616 indicates 250,000 and the circuit arrangement indicates an arrangement B, meaning that a module with the module ID 614=4 is using a resource corresponding to 250,000 out of the total module resource 613 of 1,000,000. In addition, it is shown that the module uses a circuit resource of the arrangement B in the partial rewrite area 203 (refer to FIG. 12B to be described later).

In the present example, by providing the network management apparatus 101 with the service resource management database 601 and having the module program calculation unit 506 determine whether or not the circuit resource of the partial rewrite area 203 in the logic circuit 202 of a line card can be optimized, various service functions with circuit configurations of different sizes can be accommodated.

<Sequence Example of Communication System>

FIG. 7 is a sequence diagram showing an example of an addition of a new module accompanying a change in a circuit arrangement of an existing module in a communication system according to the present example. FIG. 7 shows a sequence in which, in a case where a program file for accommodating a new service cannot be created without changing a circuit arrangement of an existing module 253 that is being used when adding the program file, the circuit arrangement of the existing module 253 is changed to optimize the partial rewrite area 203 while continuing a service being provided by the existing module 253 and subsequently adding the program file to a new module 253.

First, the maintenance person's terminal 102 requests the network management apparatus 101 to calculate a module program to determine whether or not a program file for accommodating a new service can be added to the present communication apparatus 2 (S701). An example of a module program calculation request screen on the maintenance person's terminal 102 will be described later with reference to FIG. 10.

Next, in accordance with the received calculation request, the network management apparatus 101 performs a module program calculation process (details to be provided in FIG. 8) to be described later (S702), and notifies the maintenance person's terminal 102 of a calculation result (S703). FIG. 7 shows a case where, when adding a program file to accommodate a new service, the program file cannot be created without changing a circuit arrangement of an existing module 253 that is being used. Therefore, in step S703, the fact that the calculation result indicates "not feasible" or, in other words, the fact that circuit arrangement cannot be performed and a program file cannot be added is notified.

Next, the maintenance person's terminal 102 confirms the calculation result received from the network management apparatus 101 (S704). In step S704, the fact that the calculation result indicates "not feasible" or, in other words, the fact that circuit arrangement cannot be performed and a program file cannot be added is confirmed. Respective examples of a module program calculation result notification screen and a circuit arrangement confirmation screen on the maintenance person's terminal 102 will be described later with reference to FIGS. 11, 12A, and 12B.

Next, before changing the circuit arrangement of the existing module 253, the maintenance person's terminal 102 requests the network management apparatus 101 to calculate a module program to determine whether or not a program file for arranging the circuit of the existing module 253 in another module 253 that is a change destination can be added (S705).

Next, in accordance with the received calculation request, the network management apparatus 101 performs a module program calculation process (S706) in a similar manner to step S702, and notifies the maintenance person's terminal 102 of a calculation result (S707). In step S707, the fact that the calculation result indicates "feasible" or, in other words, the fact that circuit arrangement can be performed and a program file can be added is notified. In this case, in step S707, since the maintenance person's terminal 102 requests the calculation while confirming circuit usage or, in other words, while confirming usage of an available circuit resource of the partial rewrite area 203, the calculation result is expected to indicate "feasible". However, when the calculation result is "not feasible", steps S704 and thereafter may be performed once again.

Next, the maintenance person's terminal 102 confirms the calculation result received from the network management apparatus 101 (S714). In step S714, the fact that the calculation result indicates "feasible" or, in other words, the fact that circuit arrangement can be performed and a program file can be added is confirmed.

Next, the maintenance person's terminal 102 requests the network management apparatus 101 to change the circuit arrangement of the existing module 253 (S708). An example of a circuit arrangement change configuration screen on the maintenance person's terminal 102 will be described later with reference to FIG. 13.

Next, the network management apparatus 101 inputs an indication for a circuit arrangement change of the existing module 253 to the communication apparatus 2 (S709). The indication of step S709 includes a program file to be additionally installed or, in other words, a program file for arranging the circuit of the existing module 253 in another module 253 that is a change destination.

Next, in accordance with the received indication, the communication apparatus 2 performs a circuit arrangement change process (details to be provided in FIG. 9A) to be described later (S710), and notifies the network management apparatus 101 of completion of the arrangement change (S711).

After receiving the completion of the arrangement change from the communication apparatus 2, the network management apparatus 101 updates the service resource management database 501 (S712) and notifies the maintenance person's terminal 102 of completion of the arrangement change (S713).

At this point, the maintenance person's terminal 102 once again requests the network management apparatus 101 to calculate a module program to determine whether or not a program file for accommodating a new service can be added to the present communication apparatus 2 (S715).

Next, in accordance with the received calculation request, the network management apparatus 101 performs a module program calculation process (S716) in a similar manner to step S702, and notifies the maintenance person's terminal 102 of a calculation result (S717). In step S717, the fact that the calculation result indicates "feasible" is notified. Moreover, when the calculation result indicates "not feasible" in step S717, steps S704 and thereafter may be performed once again or steps S715 and thereafter may be performed once again after reducing processing performance or the number of accommodated user terminals to be requested for the new service.

Next, the maintenance person's terminal 102 requests the network management apparatus 101 to register a new module 253 for accommodating the new service (S718).

Next, the network management apparatus 101 inputs an indication for circuit addition of the new module 253 to the communication apparatus 2 (S719). The indication of step S719 includes a program file of the new module 253 to be additionally installed.

Next, in accordance with the received indication, the communication apparatus 2 performs a circuit addition process (details to be provided in FIG. 9B) to be described later (S720), and notifies the network management apparatus 101 of completion of the circuit addition (S721).

After receiving the completion of the circuit addition from the communication apparatus 2, the network management apparatus 101 updates the service resource management database 501 (S722) and notifies the maintenance person's terminal 102 of completion of registration (S723).

As described above, when a free area in which a new module 253 can be arranged is not available in a partially reconfigurable area of the logic circuit 202, the NIF management unit 205 secures a free area in which the new module 253 can be arranged by causing the existing module 253 to evacuate to another position in the partially reconfigurable area of the logic circuit 202 and creates the new module in the free area. When there is no free area to arrange a module 253 to be newly added on the logic circuit 202, since an existing module 253 is migrated to create the free area, the module 253 can be efficiently arranged on the logic circuit 202.

In other words, in the present example, by changing a circuit arrangement of the existing module 253 and optimizing a circuit resource of the partial rewrite area 203 in the logic circuit 202 of a line card as described above, various service functions requiring circuit configurations of different sizes can be newly accommodated.

<Module Program Calculation Process>

Figure 8:
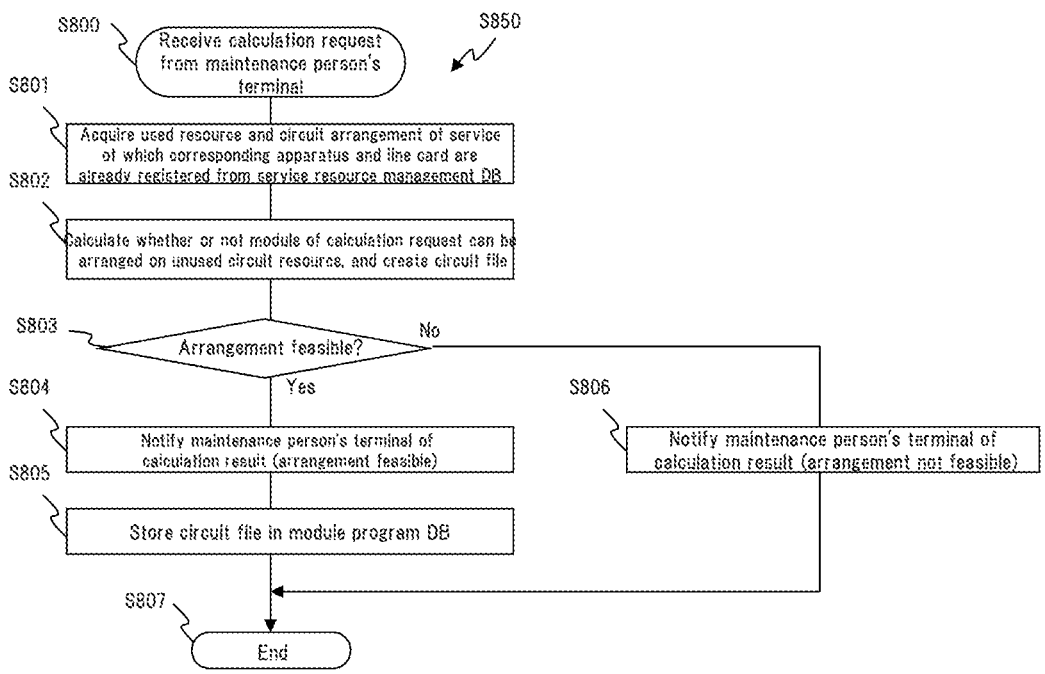
FIG. 8 is a flow chart of a module program calculation process according to an example.

Next, a module program calculation process S850 executed by the module program calculation unit 506 will be described with reference to FIG. 8. FIG. 8 is a flow chart of a module program calculation process according to the present example.

When a calculation request for a module program is received from the maintenance person's terminal 102 (S800), the module program calculation unit 506 acquires information such as the used resource amount 616 and the circuit arrangement information 617 of a service of which the corresponding apparatus ID 601 or 611 and the line card ID 602 or 612 have already been registered from the service resource management database 501 (S801). After step S801, the module program calculation unit 506 calculates whether or not the module program for which the calculation request had been made can be arranged on an unused circuit resource and generates a program file (S802).

Next, based on a result of the calculation performed in step S802, the module program calculation unit 506 determines whether or not the module program for which the calculation request had been made can be arranged on an unused circuit resource (S803). When it is determined in the process of step S803 that the module program for which the calculation request had been made can be arranged on an unused circuit resource (Yes), the module program calculation unit 506 notifies the maintenance person's terminal 102 that the calculation result indicates "feasible" (S804), and stores the program file generated in the process of step S802 in the module program database 503 (S805). Subsequently, after step S805, the module program calculation process S850 is ended (S807).

When it is determined in the process of step S803 described above that the module program for which the calculation request had been made cannot be arranged on an unused circuit resource (No), the module program calculation unit 506 notifies the maintenance person's terminal 102 that the calculation result indicates "not feasible" (S806), and ends the module program calculation process S850 (S807).

As described above, according to the present example, when there is no free area where a new module 253 can be arranged in a partially reconfigurable area of the logic circuit 202, the network management apparatus 101 confirms that a module (a second module) 253 having a same function as a module (a first module) 253 to be evacuated can be arranged in a free area and notifies the communication apparatus 2 of circuit configuration information for arranging the second module 253 in the free area. The communication apparatus 2 creates the second module 253 in the free area based on the notified circuit configuration information and notifies the network management apparatus 101 of completion of the arrangement change. The network management apparatus 101 confirms that the new module 253 can be arranged in a free area and notifies the communication apparatus 2 of circuit configuration information for arranging the new module 253 in the free area. The communication apparatus 2 creates the new module 253 in the free area based on the notified circuit configuration information and notifies the network management apparatus 101 of completion of circuit addition. Since the network management apparatus 101 which manages the communication apparatus 2 is provided and a circuit configuration of the communication apparatus 2 is controlled from the network management apparatus 101, a maintenance person can manage the circuit configuration of the communication apparatus 2 in the communication system in a consolidated manner.

In addition, the network management apparatus 101 determines whether or not a second module can be arranged in a free area, when the second module cannot be arranged, notifies the maintenance person's terminal 102 of the fact that the second module cannot be arranged, when the second module can be arranged, notifies the maintenance person's terminal 102 of the fact that the second module can be arranged, and notifies the communication apparatus 2 of circuit configuration information for arranging the second module in the free area. When notified of completion of arrangement change by the communication apparatus 2, the network management apparatus 101 determines whether or not a new module 253 can be arranged in the free area. When the new module 253 cannot be arranged, the network management apparatus 101 notifies the maintenance person's terminal 102 of the fact that the new module 253 cannot be arranged, when the new module 253 can be arranged, the network management apparatus 101 notifies the maintenance person's terminal 102 of the fact that the new module 253 can be arranged and notifies the communication apparatus 2 of circuit configuration information for arranging the new module 253 in the free area. Since the maintenance person is notified of whether or not a circuit configuration can be changed before the circuit configuration is changed, the maintenance person can confirm the change to be made to the circuit configuration in advance.

<Sequence Example of Circuit Arrangement Change>

Figure 9A:
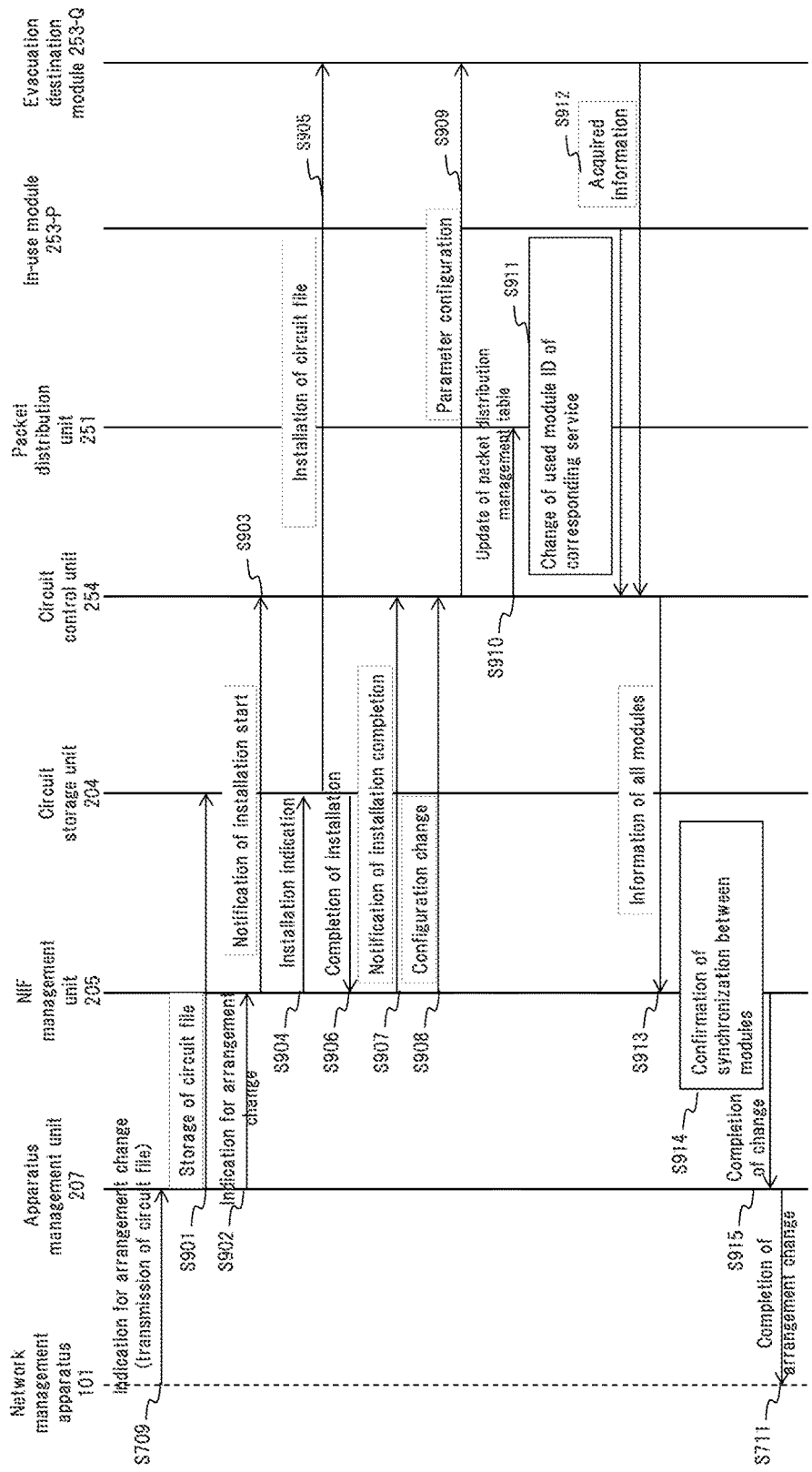
FIG. 9A is a sequence diagram showing an example of a change in a circuit arrangement in a communication apparatus according to an example.

Next, a process of circuit arrangement change performed by the communication apparatus 2 according to the present example will be described with reference to FIG. 9A. FIG. 9A is a sequence diagram showing an example of a circuit arrangement change by the communication apparatus 2 according to the present example. FIG. 9A shows a sequence involving respective processing units (the apparatus management unit 207, the NIF management unit 205, the circuit storage unit 204, the circuit control unit 254, the packet distribution unit 251, and the modules 253 (an in-use module 253-P and an evacuation destination module 253-Q, where P and Q are arbitrary natural numbers between 1 and M)) included in the communication apparatus 2 in the process of step S710 shown in FIG. 7.

First, when the apparatus management unit 207 receives an arrangement change indication (including a program file for arranging a circuit of an existing module 253 at another module 253 that is a change destination) from the network management apparatus 101, the apparatus management unit 207 stores the program file in the circuit storage unit 204 (S901), and issues an indication for an arrangement change to the NIF management unit 205 (S902). For example, the arrangement change indication includes an ID of the corresponding NIF 200, a corresponding service type, an ID of the in-use module 253-P, and an ID of the evacuation destination module 253-Q (the module 253 at which the circuit is to be rearranged).

Next, the NIF management unit 205 notifies the circuit control unit 254 of start of installation of the program file (S903). At this point, in preparation of the effect of configuration on the circuit in use due to a change in circuit configuration, for example, the circuit control unit 254 may perform a reset input (not shown) to a coupling portion between the evacuation destination module 253-Q and the common circuit (the packet distribution unit 251, the packet multiplexing unit 252, and the circuit control unit 254). Due to the reset input, a circuit being subject to configuration can be prevented from affecting a circuit already in use.

Next, the NIF management unit 205 transmits an installation indication to the circuit storage unit 204 (S904), and the circuit storage unit 204 installs the program file to the evacuation destination module 253-Q (S905).

When the installation is completed, the circuit storage unit 204 notifies the NIF management unit 205 of the completion of installation (S906), and the NIF management unit 205 transmits an installation completion notification to the circuit control unit 254 (S907). At this point, when the reset input (not shown) described earlier is being performed, the circuit control unit 254 cancels the reset input and enables the coupling portion between the evacuation destination module 253-Q and the common circuit (the packet distribution unit 251, the packet multiplexing unit 252, and the circuit control unit 254).

Next, the NIF management unit 205 issues an indication to the circuit control unit 254 to change the configuration of the module 253 to be used (S908). The indication in step S908 is an indication to change the module 253 to be used by the service in operation from the in-use module 253-P to the evacuation destination module 253-Q.

Next, the circuit control unit 254 configures same parameters (flow information corresponding to the user terminal 105 to be accommodated and the like) as parameters configured for the in-use module 253-P to the evacuation destination module 253-Q (S909). This completes preparation for distributing data to the evacuation destination module 253-Q.

Next, the circuit control unit 254 issues an indication to the packet distribution unit 251 to update the packet distribution management table 3 (S910), and the packet distribution unit 251 updates information of the used module ID 302 of the corresponding used service 301 from P (in other words, the in-use module 253-P) to Q (in other words, the evacuation destination module 253-Q) (S911). In step S911 and thereafter, the packet distribution unit 251 distributes data in the service to the evacuation destination module 253-Q by performing the packet distribution process S450.

At this point, as described earlier, the respective processing units (the packet distribution unit 251, the packet multiplexing unit 252, and the M-number of modules 253) included in the logic circuit 202 store a processing result in a register value for notification of the circuit control unit 254. For example, when the respective processing units periodically store a processing result in a register value for notification of the circuit control unit 254, there may be cases where a processing result also remains in the in-use module 253-P at a timing where the packet distribution management table 3 is updated.

Therefore, the circuit control unit 254 acquires processing results from both the in-use module 253-P and the evacuation destination module 253-Q even after the packet distribution management table 3 is updated (S912).

Subsequently, the circuit control unit 254 notifies the NIF management unit 205 of information on all modules (S913), and the NIF management unit 205 confirms that synchronization is attained during switching of modules between the in-use module 253-P and the evacuation destination module 253-Q (S914). Accordingly, the service can be continued without interrupting even one data process.

Subsequently, the NIF management unit 205 notifies the apparatus management unit 207 of completion of the arrangement change (S915), and the apparatus management unit 207 notifies the network management apparatus 101 of completion of the arrangement change.

Moreover, the present example can be modified as follows.

When the NIF management unit 205 causes the existing first module 253 to evacuate to another position, the NIF management unit 205 first creates a second module with the same functions as the first module in a free area. The packet distribution unit 251 also sends, to the second module in parallel, data that is sent to the first module. The NIF management unit 205 acquires processing results of execution of processing from the first module 253 and the second module 253. Based on the processing result of the first module 253 and the processing result of the second module 253, the packet distribution unit 251 confirms that the processing of the second module 253 has synchronized with the processing of the first module 253. After the confirmation is made, the packet distribution unit 251 suspends sending data to the first module 253. Since data is sent in parallel to the first module and the second module after the second module is created and data transmission to the first module is suspended after a state of processing of data by the second module is synchronized with that of the first module, a module can be evacuated without interrupting data.

<Sequence Example of Circuit Addition>

Figure 9B:
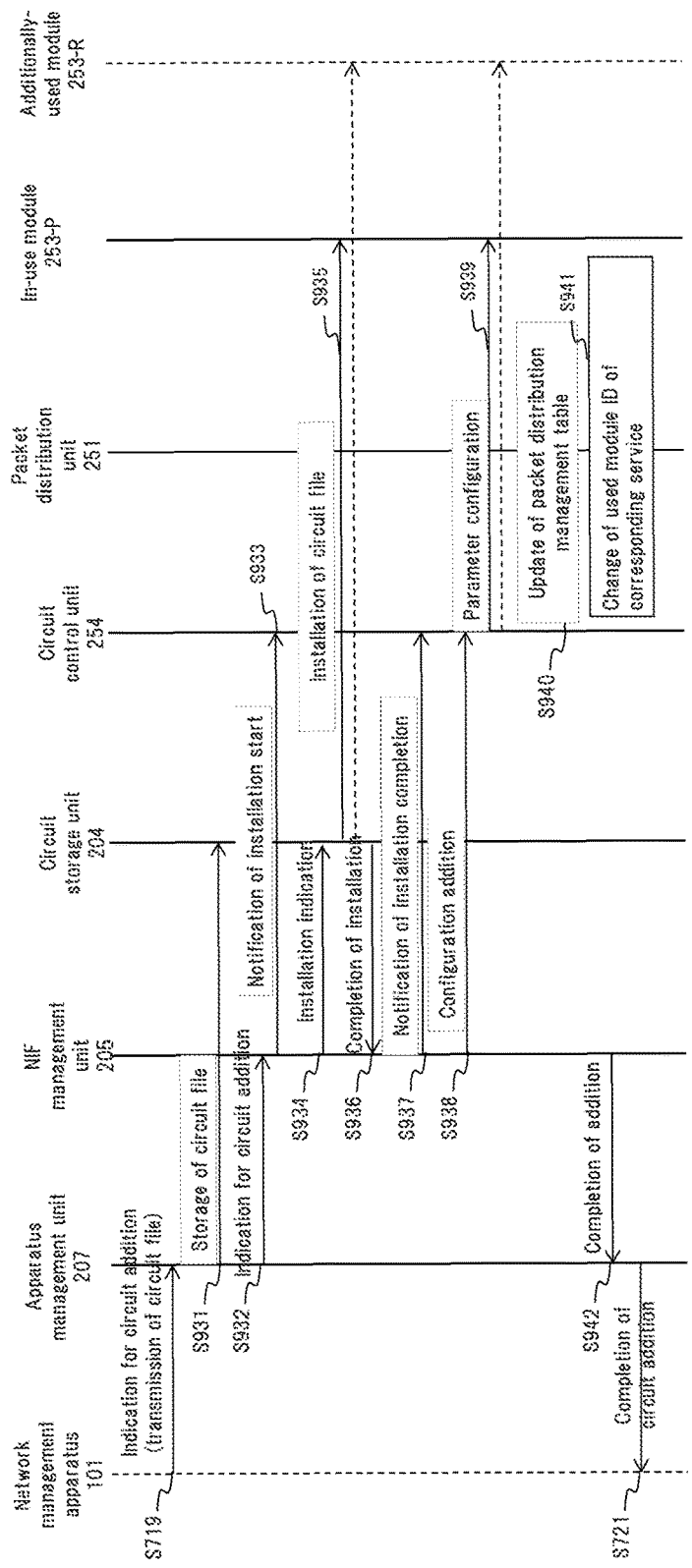
FIG. 9B is a sequence diagram showing an example of an addition of a circuit in a communication apparatus according to an example.

Next, a process of circuit addition performed by the communication apparatus 2 according to the present example will be described with reference to FIG. 9B. FIG. 9B is a sequence diagram showing an example of circuit addition in a communication apparatus 2 according to the present example. FIG. 9B shows a sequence involving respective processing units (the apparatus management unit 207, the NIF management unit 205, the circuit storage unit 204, the circuit control unit 254, the packet distribution unit 251, and the modules 253 (an in-use module 253-P and an additionally-used module 253-R, where R is an arbitrary natural number between 1 and M)) included in the communication apparatus 2 in the process of step S720 shown in FIG. 7.

First, when the apparatus management unit 207 receives an circuit addition indication (including a program file of a new module 253 to be additionally installed) from the network management apparatus 101, the apparatus management unit 207 stores the program file in the circuit storage unit 204 (S931), and issues an indication of circuit addition to the NIF management unit 205 (S932). For example, the circuit addition indication includes an ID of the corresponding NIF 200, a corresponding service type, and an ID of the new module 253. At this point, the ID of the new module 253 is the ID of the in-use module 253-P in a case where the in-use module 253-P which had been in use prior to arrangement change by the service is overwritten by the program file, but the ID of the new module 253 is the ID of the additionally-used module 253-R in a case where a new module is to be added and used.

Next, the NIF management unit 205 notifies the circuit control unit 254 of start of installation of the program file (S933). At this point, in preparation of the effect of configuration on the circuit in use due to a change in circuit configuration, for example, the circuit control unit 254 may perform a reset input (not shown) to a coupling portion between the new module 253 (the in-use module 253-P or the additionally-used module 253-R) and the common circuit (the packet distribution unit 251, the packet multiplexing unit 252, and the circuit control unit 254).

Next, the NIF management unit 205 transmits an installation indication to the circuit storage unit 204 (S934), and the circuit storage unit 204 installs the program file to the new module 253 (the in-use module 253-P (solid line) or the additionally-used module 253-R (dotted line)) (S935).

When the installation is completed, the circuit storage unit 204 notifies the NIF management unit 205 of the completion of installation (S936), and the NIF management unit 205 transmits an installation completion notification to the circuit control unit 254 (S937). At this point, when the reset input (not shown) described earlier is being performed, the circuit control unit 254 cancels the reset input and enables the coupling portion between the new module 253 (the in-use module 253-P or the additionally-used module 253-R) and the common circuit (the packet distribution unit 251, the packet multiplexing unit 252, and the circuit control unit 254).

Next, the NIF management unit 205 issues an indication to the circuit control unit 254 to add a configuration of the new module 253 (S938).

Next, the circuit control unit 254 configures parameters of a new service to the new module 253 (the in-use module 253-P or the additionally-used module 253-R) (S939). This completes preparation for distributing data to the new module 253.

Next, the circuit control unit 254 issues an indication to the packet distribution unit 251 to update the packet distribution management table 3 (S940), and the packet distribution unit 251 allocates the new used service 301 and configures information of the used module ID 302 to P (in other words, the in-use module 253-P) or R (in other words, the additionally-used module 253-R) (S941). In step S941 and thereafter, the packet distribution unit 251 distributes data in the new service to the new module 253 by performing the packet distribution process S450.

Subsequently, the NIF management unit 205 notifies the apparatus management unit 207 of completion of the circuit addition (S942), and the apparatus management unit 207 notifies the network management apparatus 101 of completion of the circuit addition.

<Example of Module Program Calculation Request Screen>

Figure 10:
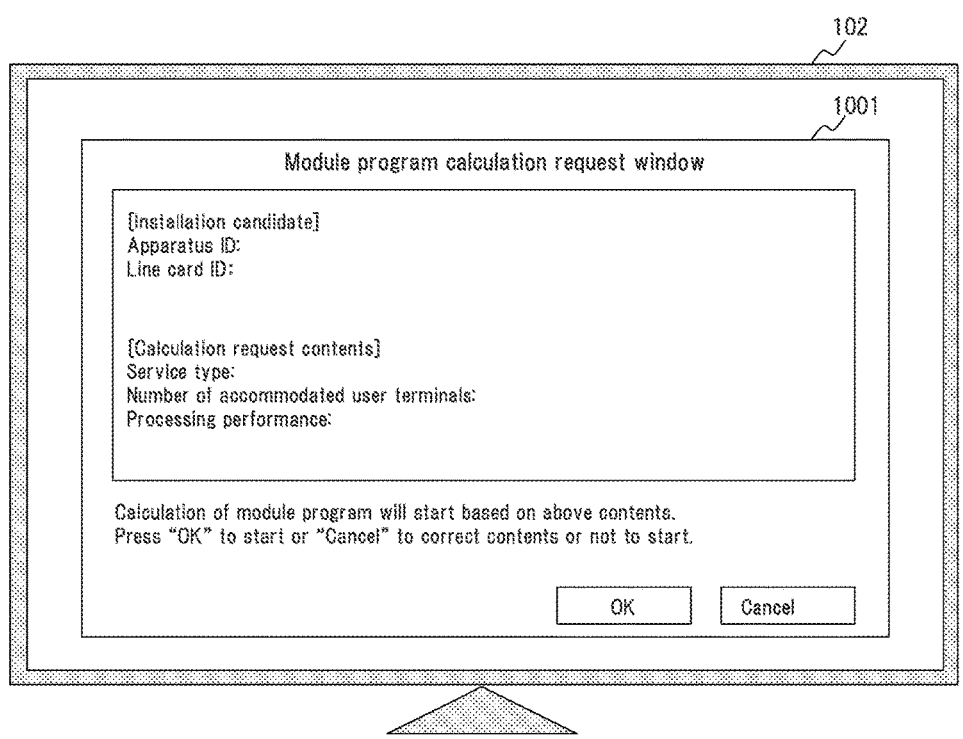
FIG. 10 is a diagram for explaining an example of a module program calculation request screen on a maintenance person's terminal according to an example.

Next, the module program calculation request screen on the maintenance person's terminal 102 will be described with reference to FIG. 10. FIG. 10 is a diagram for explaining an example of the module program calculation request screen on the maintenance person's terminal 102 according to the present example.

A module program calculation request window 1001 opens on the screen. The module program calculation request window 1001 displays information such as an apparatus ID and a line card ID for configuring an installation destination of a module program. In addition, information such as a service type, the number of accommodated user terminals, and processing performance are displayed as contents of a calculation request for creating a program file.

Furthermore, the module program calculation request window 1001 displays information which prompts an operation by the maintenance person's terminal 102 such as "Calculation of module program will start based on above contents. Press "OK" to start or "Cancel" to correct contents or to abort". For example, by pressing "OK" on the present screen, the maintenance person's terminal 102 starts the calculation request of S701 in FIG. 7.

<Example of Module Program Calculation Result Notification Screen>

Figure 11:
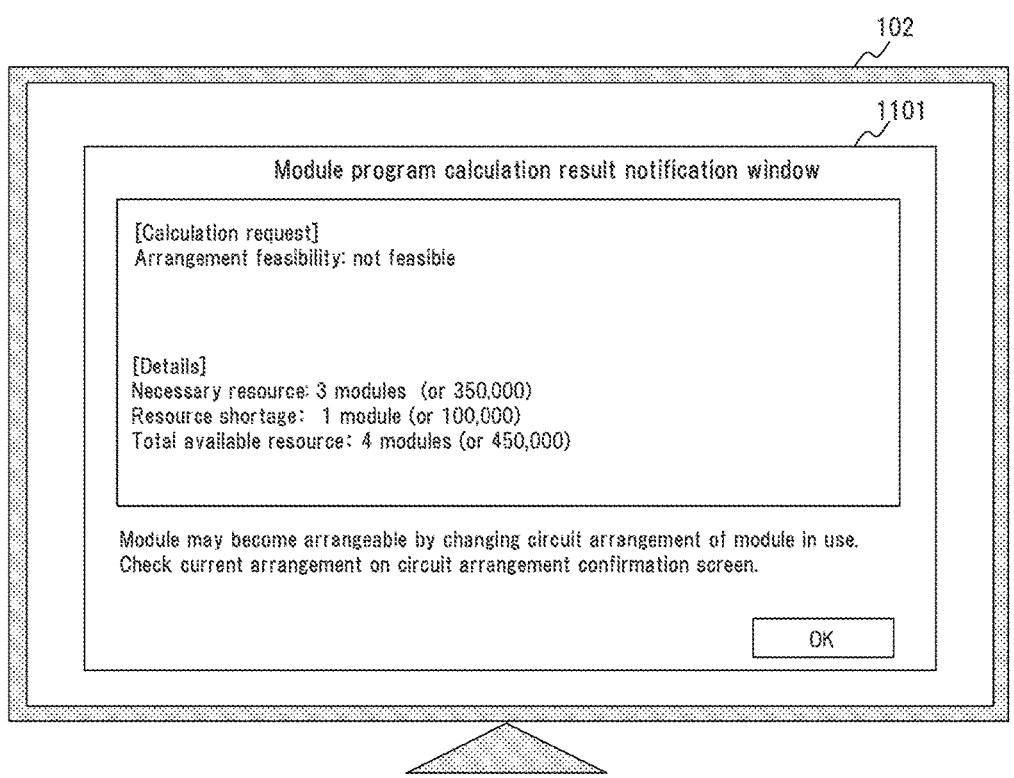
FIG. 11 is a diagram for explaining an example of a module program calculation result notification screen on a maintenance person's terminal according to an example.

Next, the module program calculation result notification screen on the maintenance person's terminal 102 will be described with reference to FIG. 11. FIG. 11 is a diagram for explaining an example of the module program calculation result notification screen on the maintenance person's terminal 102 according to the present example.

A module program calculation result notification window 1101 opens on the screen. The module program calculation result notification window 1101 displays information on whether or not arrangement is feasible (information on whether or not a program file can be added) for notifying a calculation result with respect to a module program. In addition, information such as a necessary resource, a resource shortage, and a total available resource is displayed as detailed contents of the calculation result.

Furthermore, in a case where the calculation result indicates "not feasible" but a module program may possibly be configured by changing an arrangement of a circuit in use (such as S704 in FIG. 7), the module program calculation result notification window 1101 displays information which prompts an operation for confirming a circuit arrangement of the maintenance person's terminal 102 such as "Module may become arrangeable by changing circuit arrangement of module in use. Check current arrangement on circuit arrangement confirmation screen".

<Example of Circuit Arrangement Confirmation Screen>

Next, the circuit arrangement confirmation screen on the maintenance person's terminal 102 will be described with reference to FIGS. 12A and 12B.

Figure 12A:
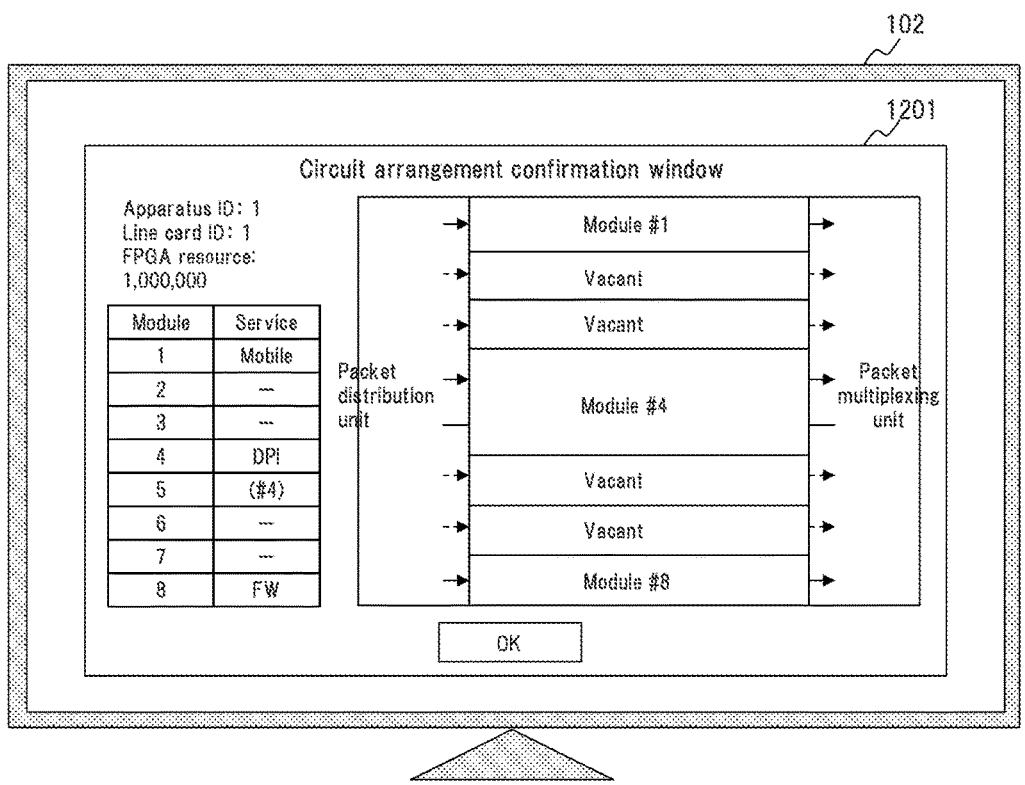
FIG. 12A is diagram for explaining an example of a circuit arrangement confirmation screen on a maintenance person's terminal when a partially rewritable circuit resource is divided in module units according to an example.

FIG. 12A is diagram for explaining an example of the circuit arrangement confirmation screen on the maintenance person's terminal 102 when a partially rewritable circuit resource is divided in module units according to the present example.

A circuit arrangement confirmation window 1201 opens on the screen. The circuit arrangement confirmation window 1201 displays information such as an apparatus ID, a line card ID, and a FPGA resource of a confirmation destination of circuit arrangement. In addition, information such as a correspondence table between the respective modules 253 and accommodated services is displayed as a service accommodation status of the line card.

Furthermore, the circuit arrangement confirmation window 1201 displays arrangement statuses of circuits of the respective processing units (the packet distribution unit 251, the packet multiplexing unit 252, and the module 253) (the circuit control unit 254 is omitted) included in the logic circuit 202 of the line card. In this case, with respect to a coupling portion between a common circuit (the packet distribution unit 251 and the packet multiplexing unit 252) and each module 253, a solid arrow indicates that coupling is in use, a dotted arrow indicates that coupling is not in use and is allocatable, and a solid straight line indicates that coupling is not in use and is not allocatable (a circuit resource in the periphery of the coupling portion is being used by another service or the like).

FIG. 12A shows an example of a case in which a circuit resource of the partial rewrite area 203 is used by being equally allocated to each module 253 and which corresponds to contents of the service resource management database 501 shown in FIG. 6A. In FIG. 6A, usage of a circuit resource is comprehended by managing an ID of the used module 253 with the service resource management database 501. For example, while the used module ID 605 indicates 4 and 5 in a portion where the service information 604 is DPI, the portion is managed as the used module ID 302: 4 in the packet distribution management table 3 shown in FIG. 3 and an equally-allocated circuit resource corresponding to two modules is used as one module 253.

Figure 12B:
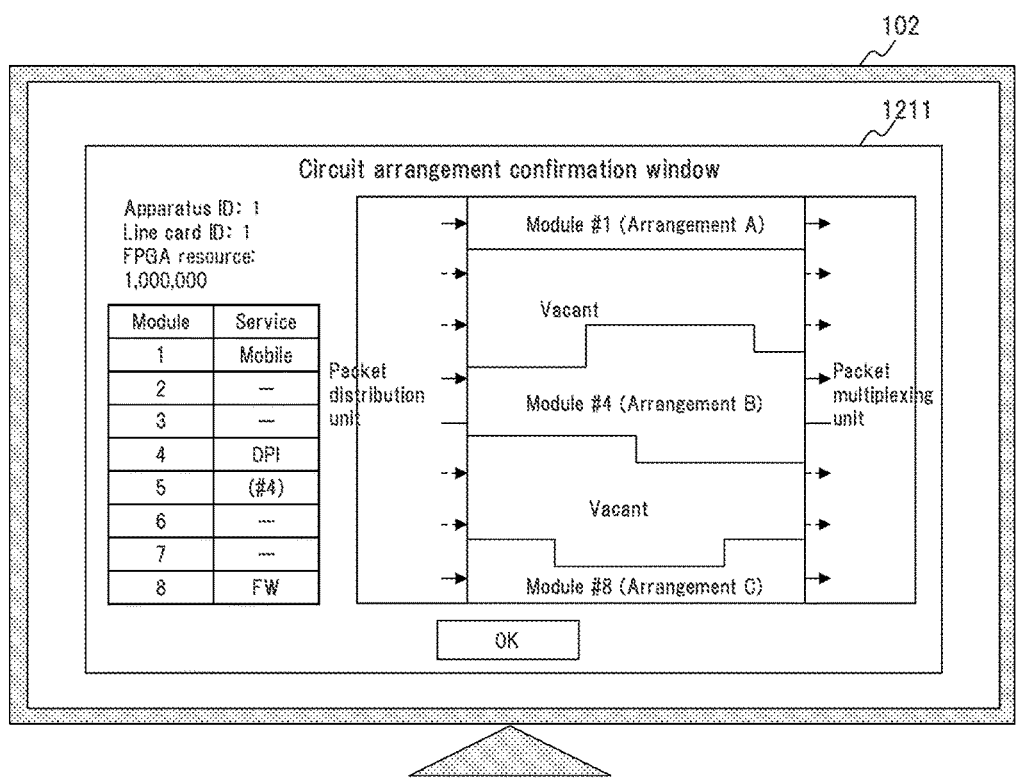
FIG. 12B is diagram for explaining an example of a circuit arrangement confirmation screen on a maintenance person's terminal when a partially rewritable circuit resource is shared among modules according to an example.

FIG. 12B is an explanatory diagram showing an example of a circuit arrangement confirmation screen on the maintenance person's terminal 102 when a partially rewritable circuit resource is shared among modules according to the present example.

A circuit arrangement confirmation window 1211 opens on the screen. The circuit arrangement confirmation window 1211 differs from the circuit arrangement confirmation window 1201 shown in FIG. 12A in the display of an arrangement status of a circuit due to a difference in how circuit resources are managed.

FIG. 12B shows an example of a case in which a circuit resource of the partial rewrite area 203 is used by being shared by all modules 253 and which corresponds to contents of the service resource management database 501 shown in FIG. 6B. In FIG. 6B, usage of a circuit resource is comprehended by managing the used resource amount 616 allocated to each module 253 and the circuit arrangement information 617 of each module 253 with the service resource management database 501. For example, while the used resource amount 616 indicates 250,000 and the circuit arrangement indicates an arrangement B in a portion where the module ID 614 is 4 and the service information 615 is DPI, the portion is managed as the used module ID 302: 4 in the packet distribution management table 3 shown in FIG. 3 and a resource corresponding to 250,000 out of the total module resource 613 of 1,000,000 is used as one module 253.

<Example of Circuit Arrangement Change Configuration Screen>

Figure 13:
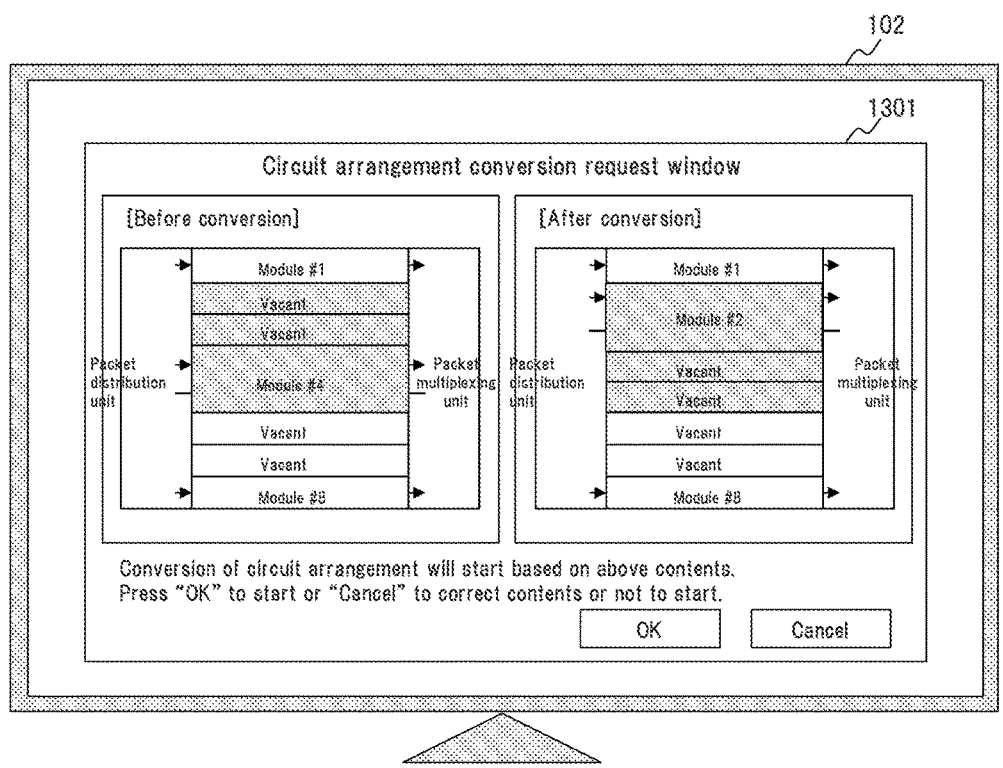
FIG. 13 is a diagram for explaining an example of a circuit arrangement change configuration screen on a maintenance person's terminal according to an example.

Next, a circuit arrangement conversion request window 1301 on the maintenance person's terminal 102 will be described with reference to FIG. 13. FIG. 13 is a diagram for explaining an example of a circuit arrangement change configuration screen on the maintenance person's terminal 102 according to the present example.

The circuit arrangement conversion request window 1301 opens on the screen. The circuit arrangement conversion request window 1301 displays an arrangement status of a circuit prior to conversion and an arrangement status of the circuit after the conversion.

Furthermore, the circuit arrangement conversion request window 1301 displays information which prompts an operation by the maintenance person's terminal 102 such as "Conversion of circuit arrangement will start based on above contents. Press "OK" to start or "Cancel" to correct contents or to abort". For example, by pressing "OK" on the present screen, the maintenance person's terminal 102 starts the arrangement change request of S708 in FIG. 7.

FIG. 13 shows an example of a case in which a circuit resource of the partial rewrite area 203 shown in FIG. 12A is used by being equally allocated to each module 253 and which a DPI service managed as module: 4 is converted to module: 2. Accordingly, since available resources are consolidated, a program file for a new service can be arranged.

As described above, according to the present example, the communication apparatus 2 can change a circuit resource of a service in use from the module 253 being used to another module 253 without interrupting even one data process. In addition, a circuit resource allocated to each module 253 can be managed and a different circuit resource can be provided for each service.

Therefore, according to the present example, a communication apparatus can be provided which is capable of optimizing hardware resources such as a circuit configuration of an FPGA and accommodating circuit configurations of different sizes corresponding to various service functions without affecting services in use.

Moreover, while a circuit resource is personally optimized by a maintenance person via the maintenance person's terminal 102 in the present example, for example, a circuit resource optimization process may be executed by the module program calculation unit 506 of the network management apparatus 101.

In addition, while a program file is created by the module program calculation unit 506 of the network management apparatus 101 in the present example, for example, a program file personally created by a maintenance person via the maintenance person's terminal 102 may be stored in the module program database 503 of the network management apparatus 101.

Moreover, it is to be understood that the present invention is not limited to the example described above and is intended to cover various modifications and equivalent configurations without departing from the spirit or the scope of the appended claims. For example, the example presented above has been described in detail to provide a clear understanding of the present invention and the present invention is not necessarily limited to embodiments including all of the configurations described above.

In addition, the control lines and information lines shown are those considered necessary for purposes of illustration and do not necessarily represent all control lines and information lines required to implement the present invention. In reality, almost all configurations may be considered to be mutually coupled.

What is claimed is:

1. A communication apparatus which transmits and receives data, the communication apparatus comprising:
a partially reconfigurable logic circuit; and
a management unit configured to manage a circuit configuration of the logic circuit, wherein
the logic circuit includes:
a plurality of modules which are located in a partially reconfigurable area of the logic circuit and which are configured to execute a prescribed process on received data; and
a data distribution unit configured to determine, based on the received data, a module to be a distribution destination of the received data from the plurality of modules and to distribute the received data to the determined module, and
the management unit is configured to:
fixedly arrange a plurality of coupling interfaces, which are used for sending data to a module determined as the distribution destination of data by the data distribution unit and which are respectively linkable to the plurality of modules, at prescribed positions on the logic circuit; and
create the module in the partially reconfigurable area of the logic circuit so as to be linked to any of the plurality of coupling interfaces.

2. The communication apparatus according to claim 1, wherein
the logic circuit further includes a circuit control unit configured to control the plurality of modules, and
the management unit is configured to:
fixedly arrange a plurality of control interfaces, which are used by the circuit control unit to control each of the plurality of modules and which are respectively linkable to the plurality of modules, at prescribed positions on the logic circuit; and
create the module so as to be linked to any of the plurality of control interfaces.

3. The communication apparatus according to claim 1, wherein
the management unit is configured to determine, based on a circuit configuration of the module in the logic circuit, distribution management information for distributing data to the module with the data distribution unit, and
the data distribution unit is configured to determine a distribution destination of the received data based on the distribution management information.

4. The communication apparatus according to claim 1, wherein
the management unit is configured to:
when a free area in which a new module can be arranged is not available in a partially reconfigurable area of the logic circuit,
secure a free area in which the new module can be arranged by causing an existing module to evacuate to another position in the partially reconfigurable area of the logic circuit; and
create the new module in the free area.

5. The communication apparatus according to claim 4, wherein
the management unit is configured to create a second module with the same function as the existing first module in the free area when causing the first module to evacuate to another position,
the data distribution unit is configured to also send, to the second module, data to be sent to the first module,
the management unit is configured to acquire a processing result of execution of the process from the first module and the second module, the data distribution unit is configured to confirm, based on the processing result of the first module and the processing result of the second module, that processing by the second module has been synchronized with processing by the first module, and the data distribution unit is configured to stop sending the data to the first module.

6. A communication system comprising:

the communication apparatus according to claim 5; and a network management apparatus configured to manage the communication apparatus, wherein when there is no free area in which a new module can be arranged in a partially reconfigurable area of the logic circuit, the network management apparatus is configured to confirm that the second module can be arranged in the free area and notify the communication apparatus of circuit configuration information for arranging the second module in the free area, the communication apparatus is configured to create the second module in the free area based on the notified circuit configuration information and notify the network management apparatus of completion of arrangement change, the network management apparatus is configured to confirm that the new module can be arranged in the free area and notify the communication apparatus of circuit configuration information for arranging the new module in the free area, and the communication apparatus is configured to create the new module in the free area based on the notified circuit configuration information and notify the network management apparatus of completion of circuit addition.

7. The communication system according to claim 6, wherein the network management apparatus is configured to:

determine whether or not the second module can be arranged in the free area;

when the second module cannot be arranged in the free area, notify a maintenance person's terminal to that effect;

when the second module can be arranged in the free area, notify the maintenance person's terminal to that effect, and notify the communication apparatus of circuit configuration information for arranging the second module in the free area;

when notified of the completion of arrangement change from the communication apparatus, determine whether or not the new module can be arranged in the free area;

when the new module cannot be arranged in the free area, notify the maintenance person's terminal to that effect; and when the new module can be arranged in the free area, notify the maintenance person's terminal to that effect, and notify the communication apparatus of circuit configuration information for arranging the new module in the free area.

8. A circuit configuration control method in a communication apparatus including a partially reconfigurable logic circuit and a management unit that manages a circuit configuration of the logic circuit, the logic circuit including a plurality of modules which are located in a partially reconfigurable area of the logic circuit and which execute a prescribed process on received data and a data distribution unit which determines, based on the received data, a module to be a distribution destination of the received data from the plurality of modules and which distributes the received data to the determined module, the method comprising:

fixedly arranging a plurality of coupling interfaces, which are used for sending data to a module determined as the distribution destination of data by the data distribution unit and which are respectively linkable to the plurality of modules, at prescribed positions on the logic circuit; and creating the module in the partially reconfigurable area of the logic circuit so as to be linked to any of the plurality of coupling interfaces.

9. The circuit configuration control method according to claim 8, wherein the logic circuit further includes a circuit control unit which controls the plurality of modules, and the method further comprising:

fixedly arranging a plurality of control interfaces, which are used by the circuit control unit to control each of the plurality of modules and which are respectively linkable to the plurality of modules, at prescribed positions on the logic circuit; and creating the module so as to be linked to any of the plurality of control interfaces.

10. The circuit configuration control method according to claim 8, further comprising:

determining, based on a circuit configuration of the module in the logic circuit, distribution management information for distributing data to the module with the data distribution unit.

11. The circuit configuration control method according to claim 10, further comprising, when a free area in which a new module can be arranged is not available in a partially reconfigurable area of the logic circuit, securing a free area in which the new module can be arranged by causing an existing module to evacuate to another position in the partially reconfigurable area of the logic circuit; and creating the new module in the free area.

12. The circuit configuration control method according to claim 11, further comprising:

creating a second module with the same function as the existing first module in the free area when causing the first module to evacuate to another position, sending data to be sent to the first module also to the second module, acquiring a processing result of execution of the process from the first module and the second module, confirming, based on the processing result of the first module and the processing result of the second module, that processing by the second module has been synchronized with processing by the first module, and stopping sending the data to the first module.

* * * * *